March 17, 1970  E. B. BYAM ET AL  3,500,521

GATE ASSEMBLY INDEXING HEAD

Filed Feb. 14, 1968  7 Sheets-Sheet 1

INVENTORS
Erwin B. Byam
Gregory L. Klein

BY De Lio and Montgomery
ATTORNEYS

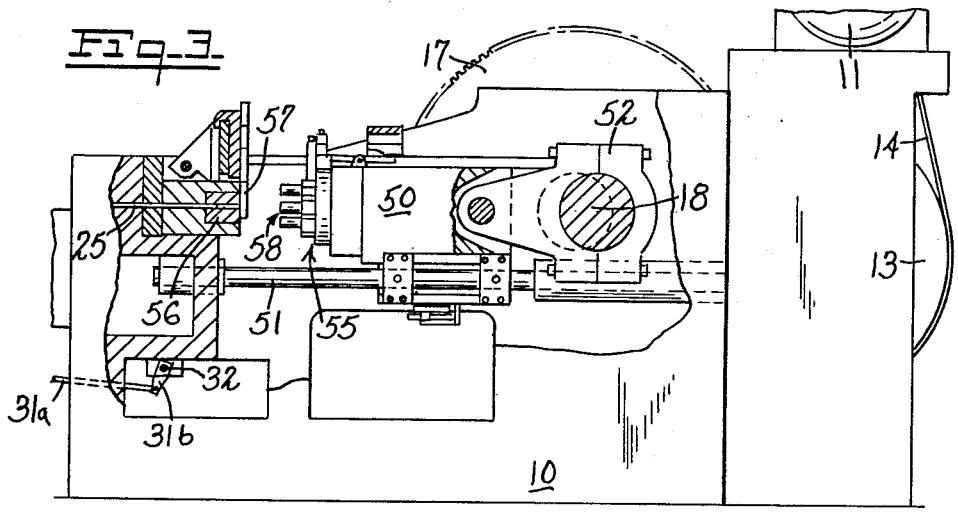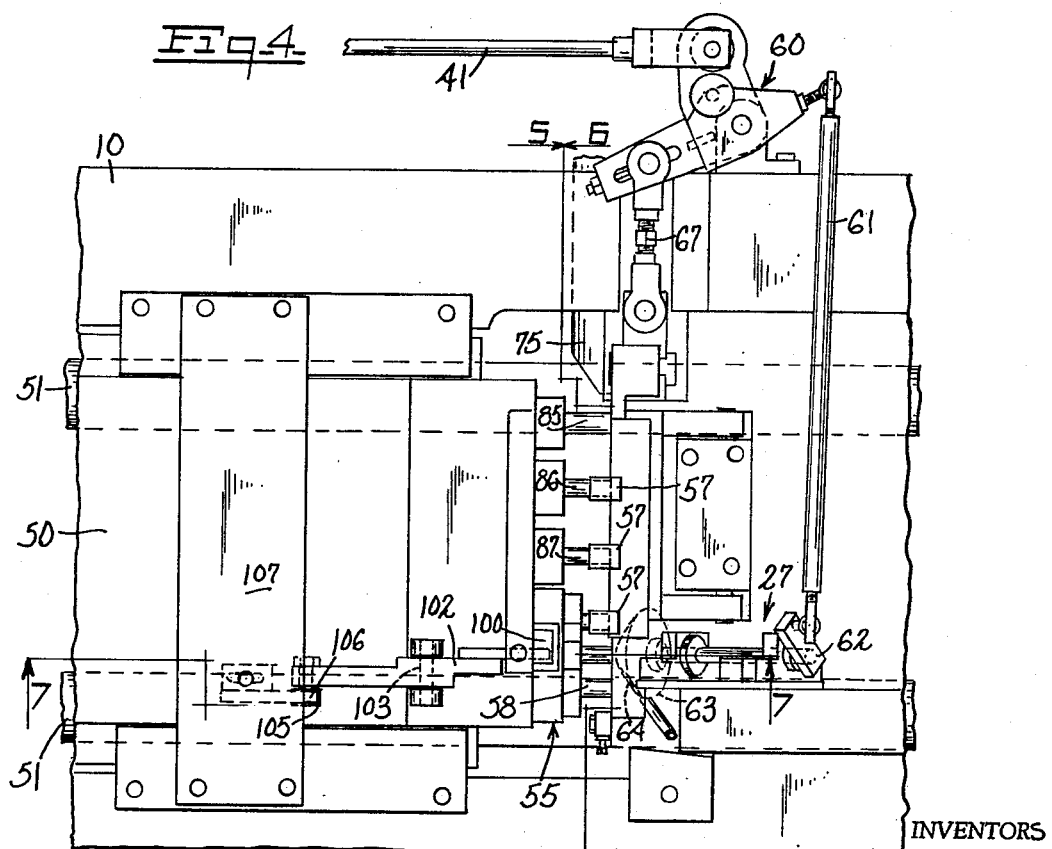

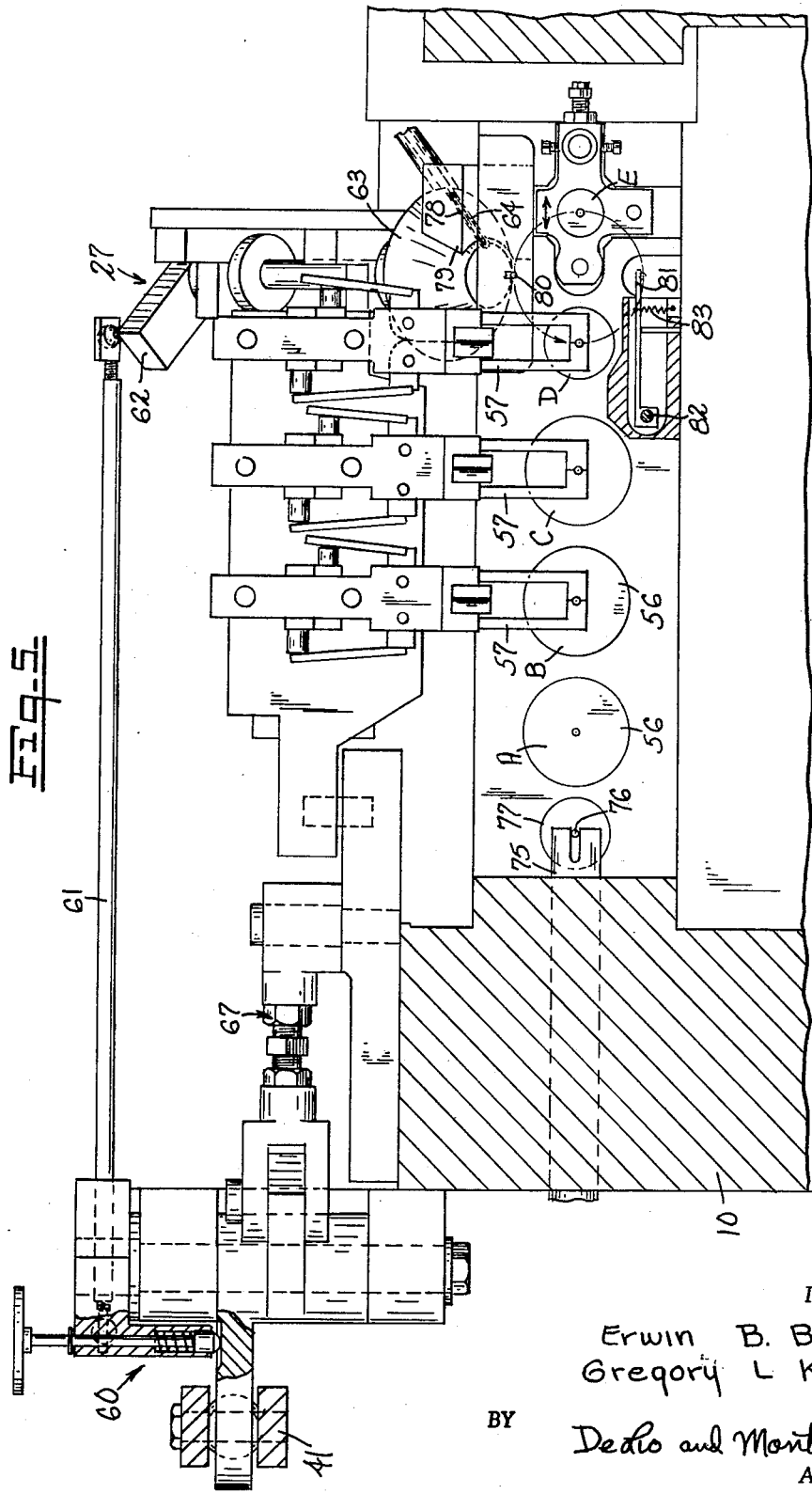

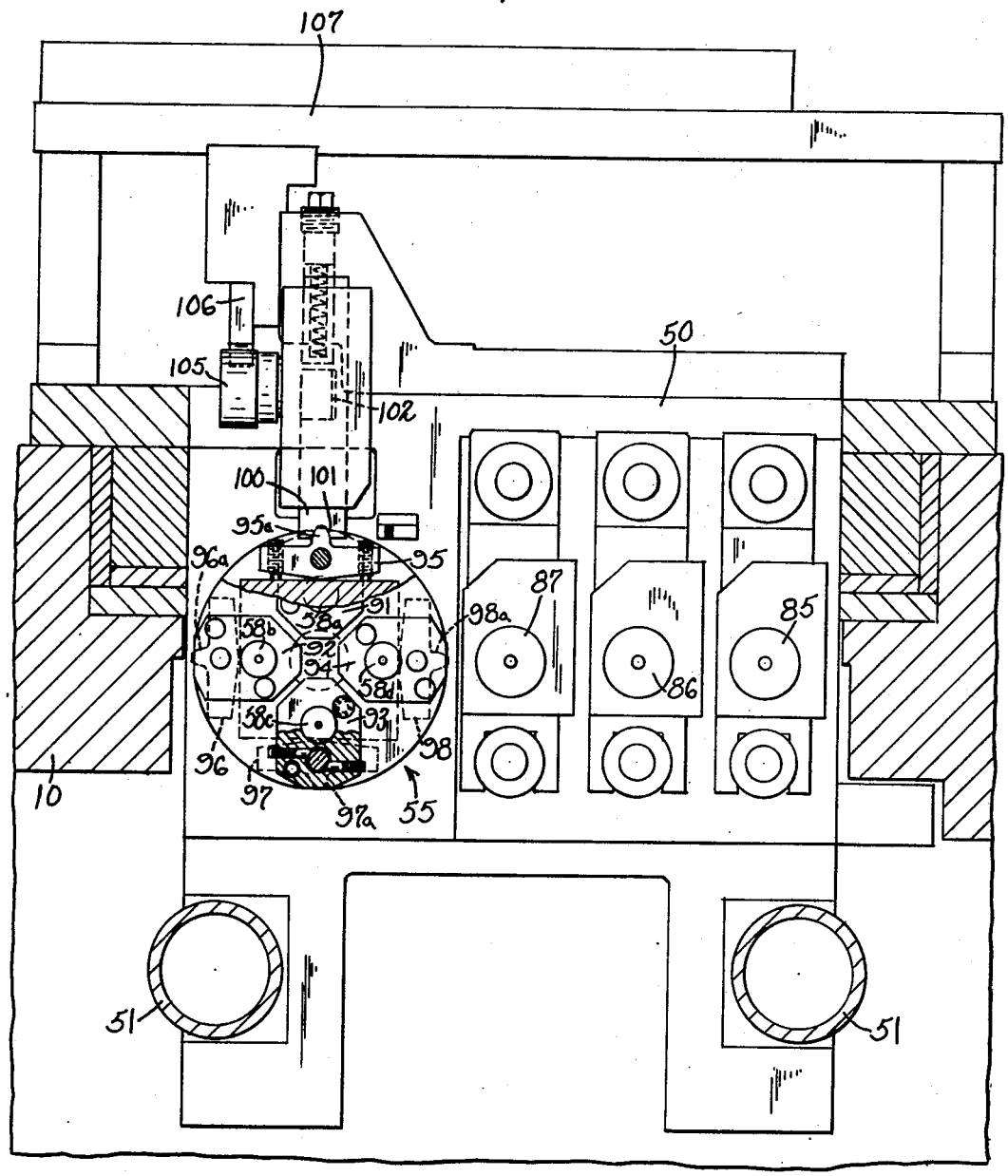

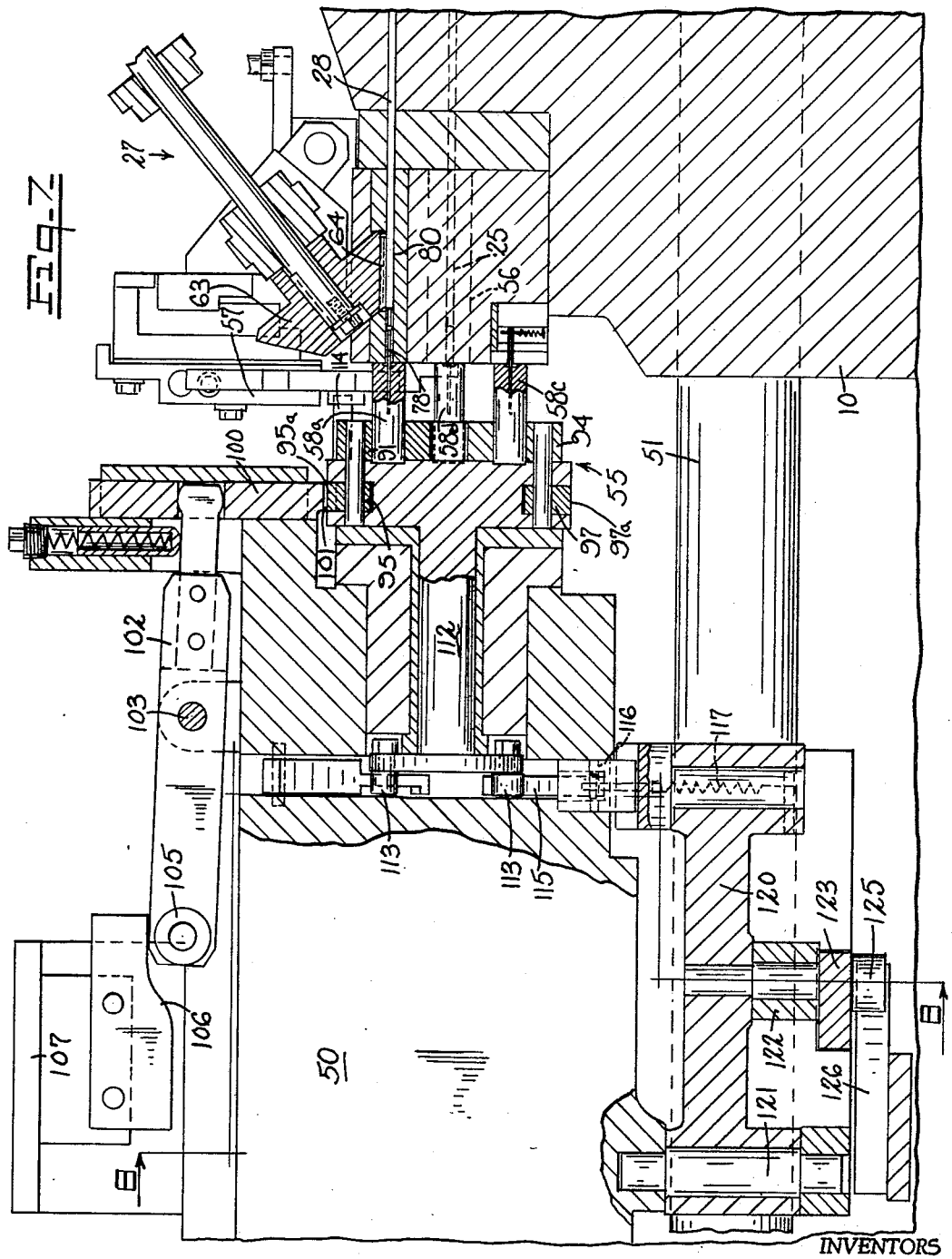

INVENTORS
Erwin B. Byam
Gregory L. Klein

DeLio and Montgomery
ATTORNEYS

March 17, 1970 E. B. BYAM ET AL 3,500,521
GATE ASSEMBLY INDEXING HEAD
Filed Feb. 14, 1968 7 Sheets-Sheet 7
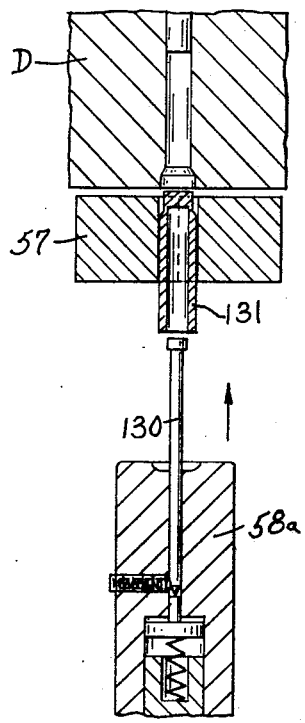
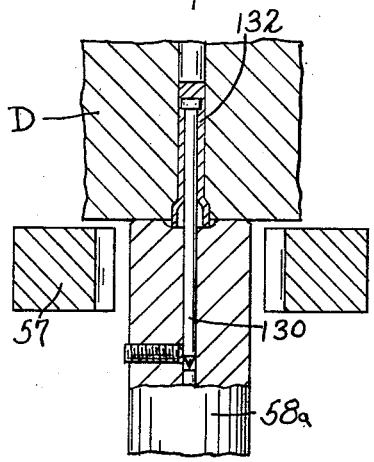
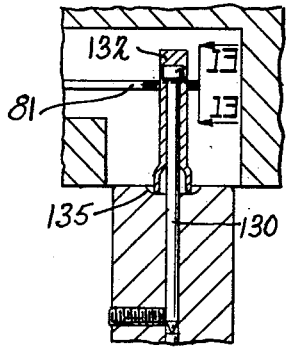
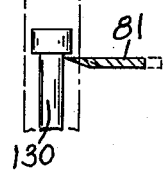
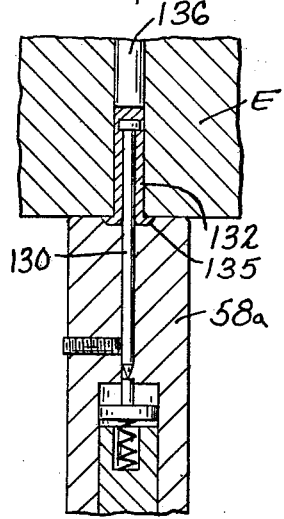
INVENTORS
Erwin B. Byam
Gregory L. Klein
BY Dedio and Montgomery
ATTORNEYS

United States Patent Office 3,500,521
Patented Mar. 17, 1970

3,500,521
GATE ASSEMBLY INDEXING HEAD
Erwin B. Byam, Wolcott, and Gregory L. Klein, Cheshire, Conn., assignors to Textron, Inc., Providence, R.I., a corporation of Delaware
Filed Feb. 14, 1968, Ser. No. 705,511
Int. Cl. B23p 23/04
U.S. Cl. 29—33    12 Claims

ABSTRACT OF THE DISCLOSURE

This invention relates to a mechanism for extending the capabilities of a primary metal working machine to include a secondary operation of assembly and possible parts forming after assembly is complete. In particular, the mechanism includes an indexing head on a gate, comprising four individual adjustable stations and a feeding unit capable of orienting and feeding a prepared unit.

---

This invention relates to machine tools and more particularly to a parts former for inserting a first metal workpiece into a second metal workpiece and thereafter forming the second workpiece.

Parts formers used a plurality of dies and punches positioned side by side, such that transfer fingers moved the workpiece between successive dies.

The present invention is an improvement over the machines of the past, with the addition of a rotary indexing punch arrangement used in conjunction with a feeding unit capable of orienting and feeding a workpiece thereto.

This invention also provides the capability of inspection of the workpiece traveling between dies, which was not readily available with prior art apparatus.

Accordingly, it is an object of this invention to provide a new and improved parts former.

Another object of this invention is to provide a new and improved apparatus for inserting one workpiece into a second workpiece and thereafter forming the second workpiece about the first.

A further object of this invention is to provide a new and improved apparatus for inserting one workpiece in another workpiece while at the same time forming one of the workpieces.

Still other objects and advantages of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

For a fuller understanding of the invention, reference is had to the following description taken in connection with the accompanyign drawings, in which:

FIG. 3 is a partial sectional view through the longitudinal center of the machine;

FIG. 4 is a top plan view of a portion of the machine;

FIG. 5 is a sectional view taken along line 5—5 of FIG. 4 showing the faces of the dies;

FIG. 6 is a sectional view taken along line 6—6 of FIG. 4 looking toward the punches;

FIG. 7 is a sectional view taken substantially along line 7—7 of FIG. 4;

FIG. 10 is a diagrammatic view showing the relation of the punch and the die upon insertion of a first workpiece into a second workpiece;

FIG. 11 is a view of the die and the punch after insertion of a first workpiece or pin into a second workpiece or a sleeve;

FIG. 12 is a view of the punch with respect to means for inspecting the combined first and second workpieces to determine whether or not there is a sleeve to accept the pin;

FIG. 13 is a sectional view taken along line 13—13 of FIG. 12; and

FIG. 14 is a diagrammatic view showing a punch and another die in which the second workpiece is further formed.

Figure 1:
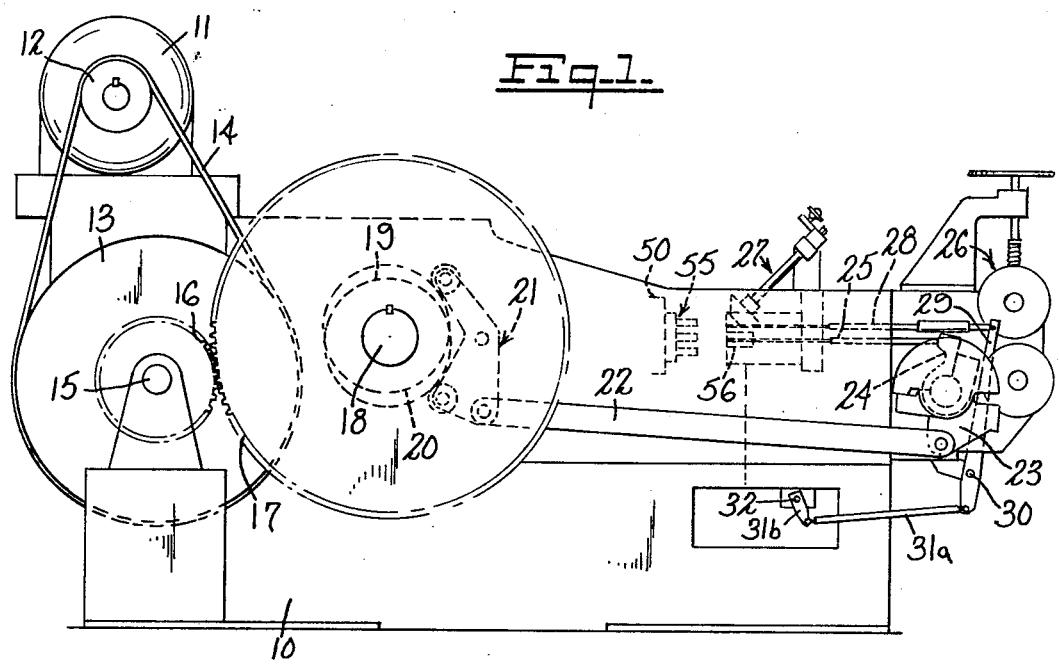
FIG. 1 is a side view of the parts former according to this invention.

Referring to FIG. 1, there is shown a side view of the parts former according to this invention. At 10 there is shown the base or frame upon which a drive motor 11 is supported which, in turn, drives one pulley 12 and a second pulley 13 through a belt 14. The pulley 13 is supported by a shaft shown at 15 on which there is mounted a gear 16. The gear 16 drives a flywheel 17 keyed to the crankshaft shown at 18. Positioned on the crankshaft 18 are two cams 19 and 20 which, in turn, drive cam followers and a crank arrangement generally shown at 21 to reciprocate a rod 22. The rod 22 is, in turn, connected to a connecting link shown at 23 which controls knockout arms generally shown at 24 and knockout pins generally shown at 25 of the dies of the machine.

At 26 there is generally shown a conventional feeding mechanism for stock, which is used to form a workpiece blank according to this invention. At 27 there is generally shown a mechanism for feeding a pin to be inserted within a sleeve-like workpiece. The explanation of the operation of the feeding mechanism will be described with relation to other figures in the drawings.

A push rod 28 is shown, which is controlled by a lever 29 pivoted at 30 and connected to connecting links 31a and 31b and thence to a shaft 32. The push rod 28 is used in conjunction with the pin feed mechanism 27 to push a pin into the punches according to this invention.

Figure 2:
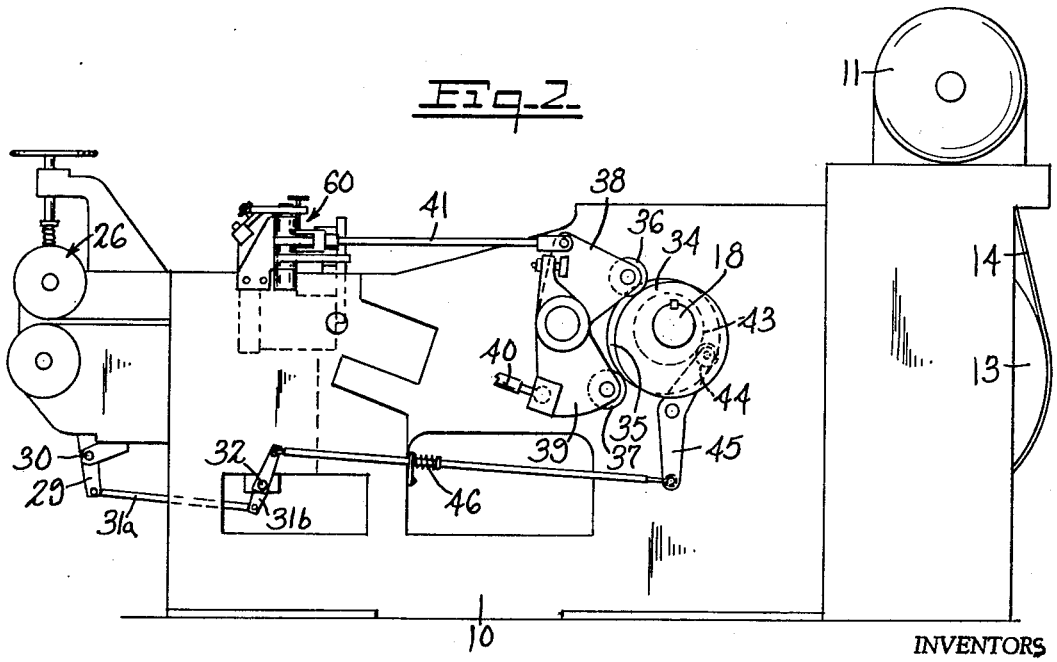
FIG. 2 is a partial side view seen from the opposite side of FIG. 1.

With reference now to FIG. 2, there is shown a partial side view of the other side of the machine shown in FIG. 1. The crankshaft is again shown at 18 and drives two cams 34 and 35 which drive cam followers 36 and 37, respectively, connected to levers 38 and 39, respectively, which in turn drive or reciprocate cut-off means shown at 40 and a rod shown at 41. The rod 41 is used to operate the transfer fingers moving between the dies as well as to control a cone-like feed mechanism which is used to feed a pin to the punches. The crankshaft also has mounted thereon a third cam shown at 43 which drives a cam follower 44 and a crank 45 which is spring-biased at 46. In this manner, the shaft 32 is driven to control the push rod 28.

Referring to FIG. 3, there is shown a gate 50 which is slidable on rods 51 and which is moved by a gate crank assembly shown at 52 driven by the crankshaft 18. The gate 50 supports an indexing head shown at 55 which advances on one of the dies shown at 56. As seen in this figure, positioned in front of the die are transfer fingers shown at 57 for moving a workpiece between some of the dies. Positioned and supported by the indexing head is a plurality of punches generally shown at 58 in the drawing. In the preferred embodiment shown, the punches comprise four in number mounted as shown in FIG. 6.

Now referring to FIG. 4, there is shown a top plan view of a portion of the machine, particularly showing the drive mechanism for the transfer fingers as well as the drive mechanism for the means for feeding a pin into the punches. In the top part of the drawing there is shown the rod 41 which drives a pivoted lever generally shown at 60. This, in turn, reciprocates a rod shown at 51 which drives a rotating crank 62 to rotate a cone-like member shown at 63. The member 63 has a slot 64 formed therein for holding a pin fed into it by a gravity feed system in a conventional manner. The cone-like member 63 is more clearly shown in FIG. 5. In addition, a transfer link is provided at 67 for moving the transfer arms 57.

With reference now to FIG. 5, there are shown the dies of the machine. This invention is particularly concerned with two of the dies, marked D and E in the drawing. Other dies, shown at A–C, as well as the cut-off die, are not of particular concern to the invention, since their operation and use is conventional. As may be seen at 75, a cut-off member is provided which operates to cut a workpiece 76 held in the cut-off die shown at 77. Thereafter, in conventional manner, the workpiece is worked on and transferred successively to dies A, B and C, such that it is formed into a sleeve-like configuration shown and more clearly described in FIG. 10. As noted previously, the transfer fingers are positioned such that they may pick up the sleeve-like workpiece from die C and position it in front of die D.

A pin 78 is supported within the slot 64 of the cone 63. In order to retain the pin 78 within slot 64, a plate 79 is provided. The plate 79 holds the pin 78 in place as it is rotated into position so that the pin may drop into a slot generally shown at 80. Thereafter, the pin 78 is pushed into a punch by the pushrod 28 referred to in connection with FIG. 1. As shown in FIG. 5, there is also provided a knife member 81 pivoted at 82 and spring located at 83, which acts as an inspection member for the workpiece held within one of the punches.

As an important feature of the invention, the die E is constructed such that it is adjustable as shown by the arrows. This is to permit alignment of the die E with the punches.

Reference should now be had to FIG. 6, which shows the indexical punches of this invention as well as the punches for the other dies. The other punches are generally shown at 85–87, respectively. The punches according to this invention are shown particularly at 58a–58d and are held in punch holders shown at 91–94, respectively. The punch holders comprise a portion of the indexing head and are mounted on the body of the indexing head, as shown. In addition, members 95–98 are provided which have tooth-like projections 95a, 96a, 97a and 98a, shown dotted, which are coupled to the indexing head such that the indexing head may be properly aligned to center a pin in the sleeve to enter die D. To effect alignment of the indexing head, there is provided a slide shown at 100 having a portion 101 cut out therefrom. The slide portion 101 engages the projections 95a–95d so that the indexing head may be rotated into alignment with the dies. To effect this movement of slide 100, a member 102 is provided which is pivotally supported at 103 on the gate 50. The member 102 is rocked by the combination of a cam follower shown at 105 which, in turn, engages a cam shown at 106 which is supported on a plate 107 mounted above the gate 50 (see FIG. 4). As the gate moves forward toward the die, the member 102 will move downwardly to align the indexing head in time to place a pin in the sleeve. Thereafter, the slide 100 is raised on the return of the gate and releases the indexing head.

Referring to FIG. 7, the indexing head is again generally shown at 55 and includes a spindle 112 which has mounted thereon a plurality of studs or rollers 113. The indexing head as shown is rotatable within the gate 50. In this figure there is also shown a member 114 positioned and supported on the gate so as to split the fingers, separating them in order to clear the punch pushing the workpiece through the fingers and into the die.

Figure 8:
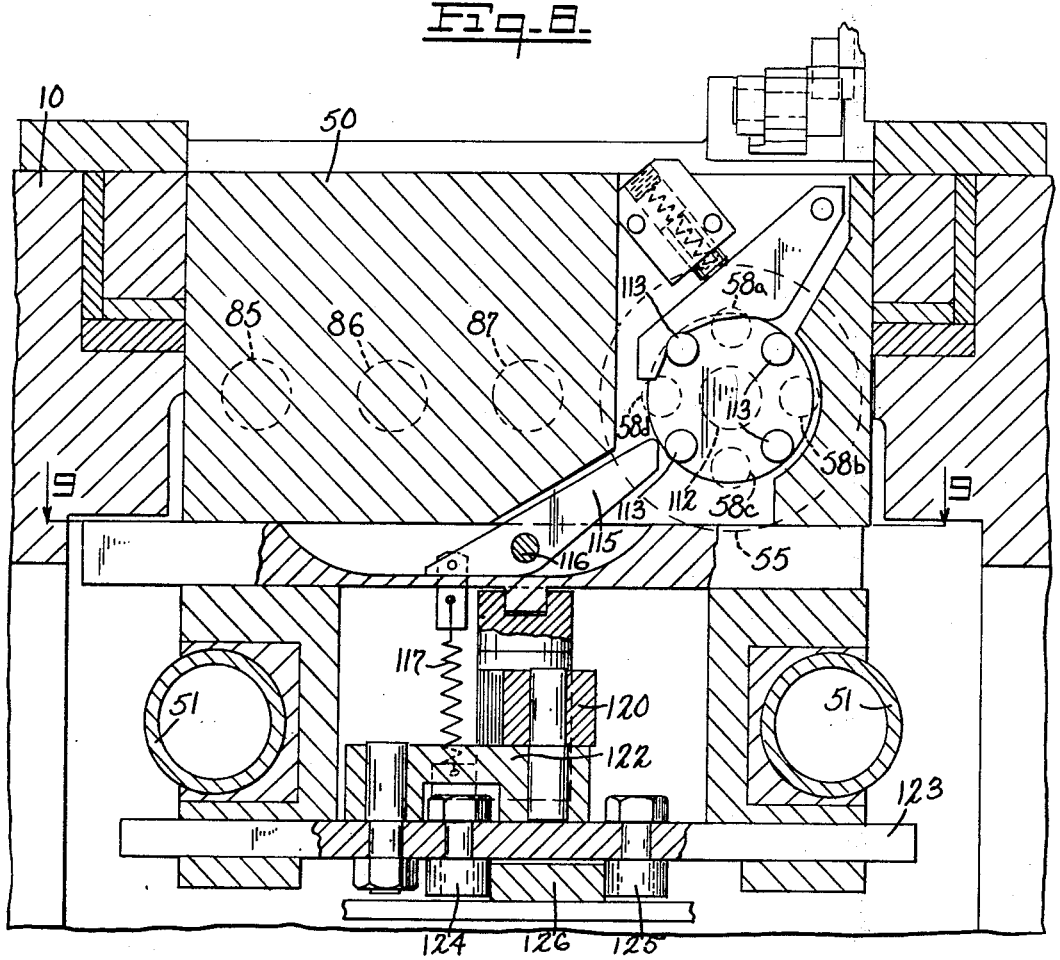
FIG. 8 is a sectional view taken along line 8—8 of FIG. 7.
Figure 9:
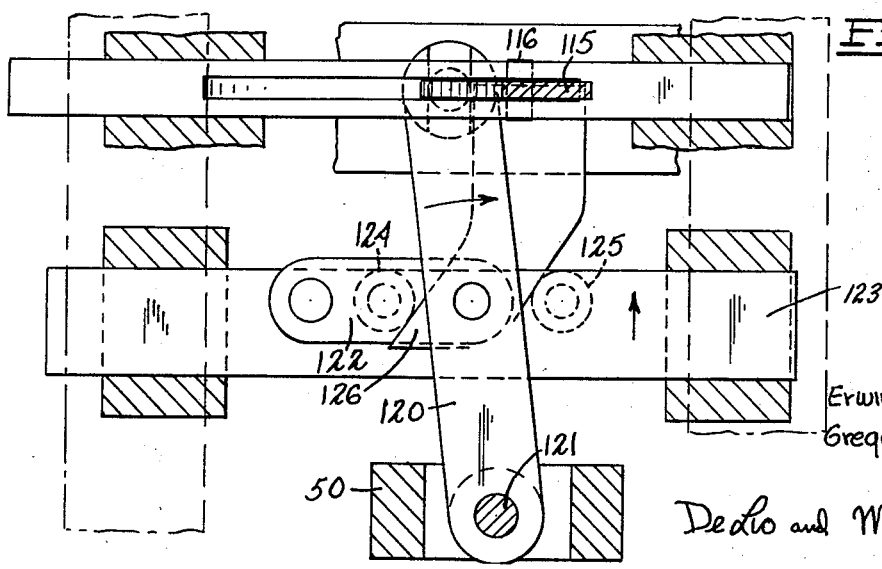
FIG. 9 is a sectional view taken along line 9—9 of FIG. 8.

Now referring to FIGS. 8 and 9, there is shown the mechanism for rotating the indexing head 55. Basically, this mechanism comprises a lever 115 pivoted at 116 and spring-loaded at 117, which permits the lever 115 to pass under each succeeding starter stud 113 and reposition the indexing lever 115 for the next indexing cycle. To effect movement of lever 115, a member shown at 120 is pivoted at 121 to the gate. The member 120 is also pivoted by means of a block 122 to a slide bar shown at 123 which carries cam followers 124 and 125 thereon. These cam followers engage a stationary cam shown at 126, such that when the gate moves, the slide 123 also moves, to cause member 120 to move lever 115 to index the indexing head 55.

With reference now to FIGS. 10–14, shown diagrammatically are the steps of the operation of the apparatus of FIGS. 1–9. As noted previously and discussed with reference to FIGS. 5 and 7, the cone-shaped carrier 63 may operate in conjunction with an escapement device of the type commonly used in the prior art, which allows the discharge of a single part into the cone each and every time the cone returns into position to receive a pin. Thereafter, the cone is indexed to a position in alignment with the first position on the indexing head corresponding to the position wherein the punch is free to receive a pin. The pin, shown at 130, will be received and held within the punch, shown as 58a, in a manner as illustrated in FIG. 10. After the pin is inserted into the punch from the cone, the indexing head 55 is then rotated 90 degrees clockwise, as viewed from the face of the gate. In this position, the punch 58a is aligned with the die D. At this time, the punch 58b is in position to receive another pin. The rotated position of the punch 58a is more particularly shown in FIG. 10, wherein the pin is shown being held and wherein a sleeve-like workpiece 131, which has been transferred by the fingers 57 from the die C, is positioned in front of the die D. At this time, the punches are moved toward the dies such that the preformed blank, shown at 132, is forced into the die D and positioned by punch 58a. As shown, the fingers 57 are spread as the punch advances toward the dies. Due to the shape of the die and the pin, the metal will flow about the pin such that it is now held firmly and securely within the confines of the sleeve 131. At this time, the punch 58a as well as the other punches, retract and the punch 58a carries the pin 130 and the sleeve 131 which has been knocked out from the die D in timed relationship with retraction of the gate. The pin and sleeve are pushed out of the die D and into the punch 58a by the knockout pin 25. The knockout pin 25 for die D is a double-acting knockout pin which first pushes the pin and sleeve in unison with the retraction of the punch in advance of the other knockouts and then knocks out the assembled pin and sleeve upon further retraction of the punch. The punches are again all indexed clockwise, as noted above, and the workpiece is in position to be inspected at the third position.

The third position comprises an inspection station having a pivotal spring-loaded knife 81. Inspection takes place on the next advance of punches 58a–58d upon the dies. If the pin is imbedded properly within the confines of the blank, the spring-loaded knife member 81 pivots downwardly and the pin and blank will remain within the punch. If the sleeve is not properly positioned about the pin, the head of the pin will engage the knife edges as shown in FIG. 13 and be ejected from the punch. FIG. 12 illustrates what occurs when the parts are properly mated, whereas the knife edge engaging the pin head is shown in FIG. 13.

At this time, the punch is again retracted and again rotated clockwise, such that a post forming operation may take place. This is more particularly shown in FIG. 14, wherein the punch 58a has advanced toward the die E, such that the sleeve 131 as well as pin 130 are positioned within the confines of the die E. Due to the shape of the punch, particularly the shoulder shown at 135, the blank will be formed with a head. Thereafter, the punches are again retracted and the knockout or ejection pin shown at 136 will push the sleeve and pin combination outwardly, such that it may drop into a container.

It should be understood that with this invention, as shown in the preferred embodiment, all the punches are of the same configuration. Due to the use of a rotary arrangement of punches as shown, it is possible for a workpiece to be received while, simultaneously, operating on a plurality of other workpieces and while inspecting still other workpieces.

It will thus be seen that the objects set forth above, among those made apparent from the preceding description, are efficiently attained and while certain changes may be made in the above constuction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of langauge, might be said to fall therebetween.

What is claimed is:

1. A parts forming apparatus, comprising a plurality of dies, a rotatable indexing head, a plurality of punches mounted on said rotatable indexing head, means for feeding a workpiece to said punches to be held by one of said punches, means for indexing said head, and means for moving said punches toward and away from said dies.

2. An apparatus according to claim 1, wherein means are provided for aligning said punches with respect to means for feeding a workpiece to said punches.

3. An apparatus according to claim 1, wherein said means for feeding a workpiece to said punches comprises a rotatable cone having a slot formed therein for receiving a workpiece.

4. An apparatus according to claim 1, including means for inspecting the workpiece as it is held by one of the punches.

5. An apparatus according to claim 1, including means for adjusting the position of one of said dies with respect to the other of said dies.

6. An apparatus according to claim 1, wherein said indexing head comprises a plurality of studs mounted on one end thereof, and wherein said means for indexing the head includes pusher means actuated upon movement of the punches.

7. An apparatus according to claim 1, wherein the rotatable head carries four punches positioned every ninety degrees about the face of the indexing head.

8. An apparatus according to claim 7, wherein there are two dies, and wherein said two dies are adapted to cooperate with said four punches.

9. An apparatus according to claim 8, wherein when two of said four punches are cooperating with the two dies, a workpiece is being fed into one of said punches and a workpiece being held in the other of said punches is inspected by inspection means.

10. A parts forming apparatus comprising a pair of dies, a plurality of punches rotatably mounted and cooperating with said dies, means for moving said punches toward and away from said dies, two of said punches cooperating with said pair of dies upon each advance of said punches toward said dies, and means for feeding a workpiece to another of said punches to hold the workpiece by one of said punches upon the advance of said punches toward said dies.

11. A parts forming apparatus according to claim 10 comprising means positioned to inspect a workpiece held in another of said punches.

12. A parts forming apparatus according to claim 11, including means for rotating said punches.

References Cited

UNITED STATES PATENTS

| | | | |
|---|---|---|---|
| 1,690,419 | 11/1928 | McCain | 10—11 |
| 2,364,693 | 12/1944 | Cherry et al. | 10—13 |
| 2,768,394 | 10/1956 | Ward | 10—13 |

FOREIGN PATENTS 627,618   8/1949   Great Britain.

ANDREW R. JUHASZ, Primary Examiner

Z. R. BILINSKY, Assistant Examiner

U.S. Cl. X.R.:

10—11